United States Patent
Tran et al.

(10) Patent No.: US 11,132,586 B2
(45) Date of Patent: Sep. 28, 2021

(54) ROLLING SHUTTER RECTIFICATION IN IMAGES/VIDEOS USING CONVOLUTIONAL NEURAL NETWORKS WITH APPLICATIONS TO SFM/SLAM WITH ROLLING SHUTTER IMAGES/VIDEOS

(71) Applicant: NEC Laboratories America, Inc., Princeton, NJ (US)

(72) Inventors: Quoc-Huy Tran, Santa Clara, CA (US); Bingbing Zhuang, Cupertino, CA (US); Pan Ji, San Jose, CA (US); Manmohan Chandraker, Santa Clara, CA (US)

(73) Assignee: NEC Corporation

( * ) Notice: Subject to any disclaimer, the term of this patent is extended or adjusted under 35 U.S.C. 154(b) by 207 days.

(21) Appl. No.: 16/593,247

(22) Filed: Oct. 4, 2019

(65) Prior Publication Data

US 2020/0134389 A1 Apr. 30, 2020

Related U.S. Application Data

(60) Provisional application No. 62/751,888, filed on Oct. 29, 2018, provisional application No. 62/878,814, filed on Jul. 26, 2019.

(51) Int. Cl.
| | |
|---|---|
| *H04N 5/225* | (2006.01) |
| *G06N 3/08* | (2006.01) |
| *G06N 3/04* | (2006.01) |
| *H04N 5/232* | (2006.01) |
| *G06T 7/20* | (2017.01) |
| *G06K 9/62* | (2006.01) |

(52) U.S. Cl.
CPC ......... *G06K 9/6263* (2013.01); *G06K 9/6256* (2013.01); *G06N 3/04* (2013.01); *G06N 3/08* (2013.01); *G06T 7/20* (2013.01); *H04N 5/2329* (2013.01)

(58) Field of Classification Search
CPC .... G06T 2207/20084; G06T 1/20; G06N 3/02
See application file for complete search history.

(56) References Cited

U.S. PATENT DOCUMENTS

| | | | |
|---|---|---|---|
| 10,939,042 B1 * | 3/2021 | Dolan | H04N 5/23267 |
| 2010/0309340 A1 * | 12/2010 | Border | H04N 5/35554 |
| | | | 348/241 |

(Continued)

OTHER PUBLICATIONS

Rengarajan, et al. "Unrolling the Shutter: CNN to Correct Motion Distortions", 2017 IEEE Conference on Computer Vision and Pattern Recognition (Year: 2017).*

(Continued)

*Primary Examiner* — Twyler L Haskins
*Assistant Examiner* — Dwight Alex C Tejano
(74) *Attorney, Agent, or Firm* — Joseph Kolodka

(57) ABSTRACT

A method for correcting rolling shutter (RS) effects is presented. The method includes generating a plurality of images from a camera, synthesizing RS images from global shutter (GS) counterparts to generate training data to train the structure-and-motion-aware convolutional neural network (CNN), and predicting an RS camera motion and an RS depth map from a single RS image by employing a structure-and-motion-aware CNN to remove RS distortions from the single RS image.

20 Claims, 6 Drawing Sheets

(56) References Cited

U.S. PATENT DOCUMENTS

| | | | | |
|---|---|---|---|---|
| 2011/0176043 A1* | 7/2011 | Baker | ............... | G06T 5/003 348/296 |
| 2016/0182793 A1* | 6/2016 | Berberian | ............ | H04N 5/2329 348/208.6 |
| 2017/0371340 A1* | 12/2017 | Cohen | ............... | G05D 1/0088 |
| 2017/0374256 A1* | 12/2017 | Wagner | ............... | H04N 5/2173 |
| 2018/0173992 A1* | 6/2018 | Zink | ............... | G06T 7/246 |
| 2018/0293712 A1* | 10/2018 | Vogels | ............... | G06T 5/002 |
| 2018/0359410 A1* | 12/2018 | Ain-Kedem | ..... | H04N 5/232123 |

OTHER PUBLICATIONS

Albl et al., "R6P—Rolling Shutter Absolute Pose Problem", 2015 IEEE Conference on Computer Vision and Pattern Recognition (CVPR). Jun. 7, 2015. pp. 2292-2300.

Albl et al., "Degeneracies in Rolling Shutter SfM", European Conference on Computer Vision. Oct. 8, 2016. pp. 36-51.

Engel et al., "LSD-SLAM: Large Scale Direct Monocular SLAM", European Conference on Computer Vision. Sep. 6, 2014. pp. 834-849.

Hedborg et al., "Rolling Shutter Bundle Adjustment", 2012 IEEE Conference on Computer Vision and Pattern Recognition. Jun. 16, 2012. pp. 1434-1441.

Hedborg et al., "Structure and Motion Estimation from Rolling Shutter Video", 2011 IEEE International Conference on Computer Vision Workshops. Nov. 6, 2011. pp. 17-23.

Ito et al., "Self-calibration-based Approach to Critical Motion Sequences of Rolling-shutter Structure from Motion", Proceedings of the IEEE Conference on Computer Vision and Pattern Recognition. Nov. 16, 2016. pp. 801-809.

Kim et al., "Direct Semi-dense SLAM for Rolling Shutter Cameras", 2016 IEEE International Conference on Robotics and Automation (ICRA). May 16, 2016. pp. 1308-1315.

Lao et al., "A Robust Method for Strong Rolling Shutter Effects Correction Using Lines with Automatic Feature Selection", 2018 Proceedings of the IEEE Conference on Computer Vision and Pattern Recognition. Jun. 18-22, 2018. pp. 4795-4803.

Mur-Artal et al., "ORB-SLAM: a Versatile and Accurate Monocular SLAM System", IEEE Transactions on Robotics. vol. 31, Issue 5. Aug. 24, 2015. pp. 1147-1163.

Purkait et al., "Rolling Shutter Correction in Manhattan World", 2017 Proceedings of the IEEE International Conference on Computer Vision. Oct. 22-29, 2017. pp. 882-890.

Schoenberger et al., "Structure-from-Motion Revisited", 2016 IEEE Conference on Computer Vision and Pattern Recognition. Jun. 26-Jul. 1, 2016. pp. 4104-4113.

Schubert et al., "Direct Sparse Odometry with Rolling Shutter", 2018 Proceedings of the European Conference on Computer Vision. Sep. 8-14, 2018. pp. 682-697.

Vasu et al., "Occlusion-Aware Rolling Shutter Rectification of 3D Scenes", 2018 Proceedings of the IEEE Conference on Computer Vision and Pattern Recognition. Jun. 18-22, 2018. pp. 636-645.

Zhuang et al., "Rolling-Shutter-Aware Differential SfM and Image Rectification", 2017 Proceedings of the IEEE International Conference on Computer Vision. Jul. 21-26, 2017. pp. 948-956.

\* cited by examiner

ROLLING SHUTTER RECTIFICATION IN IMAGES/VIDEOS USING CONVOLUTIONAL NEURAL NETWORKS WITH APPLICATIONS TO SFM/SLAM WITH ROLLING SHUTTER IMAGES/VIDEOS

RELATED APPLICATION INFORMATION

This application claims priority to Provisional Application No. 62/751,888, filed on Oct. 29, 2018, and Provisional Application No. 62/878,814, filed on Jul. 26, 2019, the contents of which are incorporated herein by reference in their entirety.

BACKGROUND

Technical Field

The present invention relates to learning structure-and-motion-aware rolling shutter correction and, more particularly, to a convolutional neural network (CNN)-based method which learns the underlying geometry from a single rolling shutter (RS) image and where RS image correction is performed.

Description of the Related Art

Many consumer cameras such as webcams or mobile phones employ complementary metal oxide semiconductor (CMOS) sensors due to their cost advantage. However, they come with the limitation of operating on a rolling shutter (RS) mechanism. In contrast to global shutter (GS), which exposes all rows of the sensor array at the same time, RS exposes them on a row-by-row basis from top to bottom with a constant time delay between consecutive rows. In the presence of camera motion during image capture, the delay between the exposure of the first row and last row can cause distortions in the captured image, resulting in deviation from the pinhole camera model.

SUMMARY

A computer-implemented method for correcting rolling shutter (RS) effects is presented. The method includes generating a plurality of images from a camera, synthesizing RS images from global shutter (GS) counterparts to generate training data to train the structure-and-motion-aware convolutional neural network (CNN), and predicting an RS camera motion and an RS depth map from a single RS image by employing a structure-and-motion-aware CNN to remove RS distortions from the single RS image.

A non-transitory computer-readable storage medium comprising a computer-readable program is presented for correcting rolling shutter (RS) effects, wherein the computer-readable program when executed on a computer causes the computer to perform the steps of generating a plurality of images from a camera, synthesizing RS images from global shutter (GS) counterparts to generate training data to train the structure-and-motion-aware convolutional neural network (CNN), and predicting an RS camera motion and an RS depth map from a single RS image by employing a structure-and-motion-aware CNN to remove RS distortions from the single RS image.

A system for correcting rolling shutter (RS) effects is presented. The system includes a memory and one or more processors in communication with the memory configured to generate a plurality of images from a camera, synthesize RS images from global shutter (GS) counterparts to generate training data to train the structure-and-motion-aware convolutional neural network (CNN), and predict an RS camera motion and an RS depth map from a single RS image by employing a structure-and-motion-aware CNN to remove RS distortions from the single RS image.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
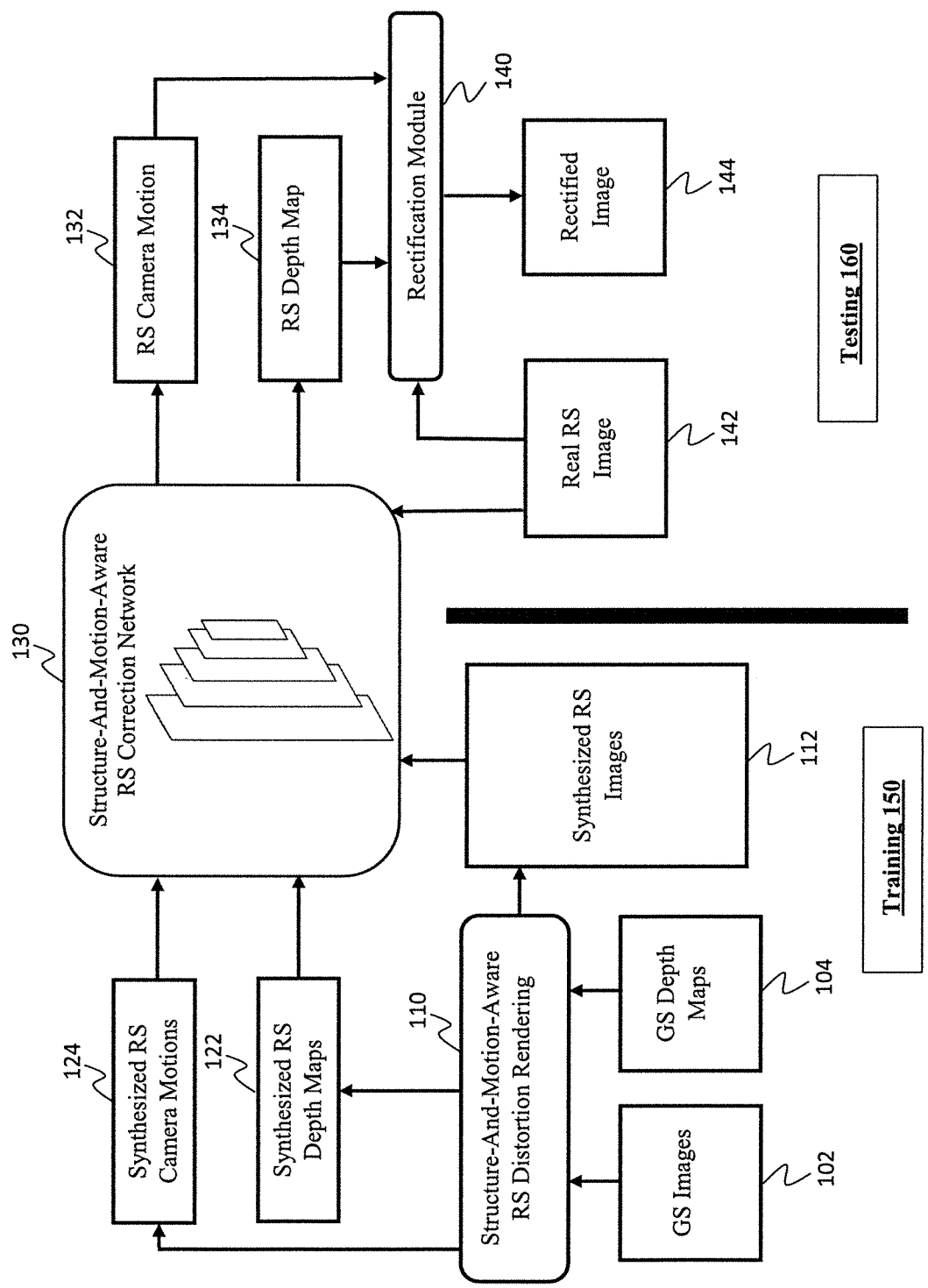
FIG. 1 is a block/flow diagram of a structure-and-motion-aware rolling shutter (RS) distortion rendering and a structure-and-motion-aware RS correction network, in accordance with embodiments of the present invention.

An exact method of correcting the rolling shutter (RS) effect entails recovering the underlying geometry, e.g., scene structures and camera motions between scanlines or between views. However, the multiple-view geometry for RS cameras is much more complicated than its global shutter (GS) counterpart, with various degeneracies. In the exemplary embodiments of the present invention, it is shown that RS two-view geometry is degenerate in the case of pure translational camera motion. In view of the complex RS geometry, the exemplary embodiments introduce a Convolutional Neural Network (CNN)-based method which learns the underlying geometry (e.g., camera motion and scene structure) from just a single RS image and RS image correction is performed. The method is referred to as a structure-and-motion-aware RS correction method because the method reasons about the concealed motions between the scanlines as well as the scene structure. The method learns from a large-scale dataset synthesized in a geometrically meaningful way where the RS effect is generated in a manner consistent with the camera motion and scene structure.

Being a pure geometric distortion, the RS effect can be corrected rigorously by recovering the underlying geometry (e.g., camera motion and 3D structure). However, due to the extra unknown parameters arising from the changes in the per-scanline camera poses during the exposure period, the geometric problem for RS cameras is often more complicated than its GS counterpart. In particular, two-view geometry of RS cameras requires 44 2D point correspondences to get a linear solution, making it generally intractable in practice. Thus, a method that employs two-view geometry to remove the RS effect has to impose special constraints, e.g., assuming differential camera motions, and needs non-trivial readout calibration.

A geometric degeneracy analysis in RS cameras is introduced by the exemplary embodiments of the present invention. Note that despite the widespread deployment of RS cameras in many real-world applications, analyses on potential degeneracies have only emerged recently. In the exemplary embodiments, it is shown that RS two-view geometry is degenerate in cases of pure translational camera motion. In particular, there are infinitely many combinations of per-scanline camera poses and scene structures that can explain the 2D points in both views exactly in terms of re-projection errors. Such degeneracy poses additional challenges in applying two-view RS geometry for rectification, due to the prevalence of pure translation in practical applications, e.g., driving scenarios.

Given such challenges by employing a pure geometric method and considering the recent successes of deep learning in geometric problems, the exemplary embodiments of the present invention introduce a data-driven approach to RS correction. Specifically, by employing a CNN-based approach, the exemplary embodiments learn to predict both the camera scanline velocity and depth from a single RS image. Although single-view depth prediction has been studied, the case of camera velocity between scanlines has not been addressed. Further, it is shown that it is feasible to estimate these camera motions from the distortion in the image appearance. The underlying intuition is that the appearance distortion represents the violation of the rigidity between all the scanlines and scene caused by camera motion during the exposure period. If enough has been learnt regarding the true geometry of the scene and its objects, this knowledge can be employed to recognize the deformation caused by the RS distortion, following which camera motion recovery should be possible. The geometry so obtained can be used for image undistortion.

The exemplary embodiments of the present invention further introduce a method for synthesizing RS images from their GS counterparts in a geometrically accurate manner, given the ground truth velocity and depth. Such information is employed to generate large-scale training data. Finally, the exemplary embodiments of the present invention also identify a further ambiguity that exists between pitch rotation and the image resizing operation during network training. FIG. 1 provides an overview of such approach. The exemplary method can be referred to as "SMARSC," which is short for Structure-And-Motion-Aware Rolling Shutter Correction, since it reasons about the scene structures and the latent motions between scanlines.

The exemplary embodiments of the present invention explicitly take into account both camera motions and scene structures, and, hence, are able to produce rectified images that are not only visually pleasant but also geometrically consistent. Therefore, in summary, the exemplary embodiments of the present invention identify and establish a detailed proof that RS two-view geometry is degenerate under pure translation, which is helpful in understanding the intrinsic and algorithm-independent properties of RS two-view geometry estimation. For single-view RS correction, the exemplary embodiments of the present invention introduce a CNN-based approach that is strongly governed by the underlying geometry, thus achieving good performance. The exemplary embodiments of the present invention further introduce a geometrically meaningful way to synthesize large-scale training data and identify a geometric ambiguity that arises for training.

FIG. 1 illustrates structure-and-motion-aware rolling shutter (RS) distortion rendering 110 and a structure-and-motion-aware RS correction network 130. During a training phase 150, a set of GS images 102 and corresponding GS depth maps 104 are employed by the structure-and-motion-aware RS distortion rendering pipeline 110 to generate synthesized RS camera motions 124, synthesized RS depth maps 122, and synthesized RS images 112. The images 112 are then used as input data, while the camera motions 124 and depth maps 122 are then used as supervision signals for training the structure-and-motion-aware RS correction network (SMARSC) 130. During a testing phase 160, a single real RS image 142 is input to SMARSC 130. The network 130 predicts an RS camera motion 132 and an RS depth map 134 corresponding to the input image. Finally, the RS image 142, the RS camera motion 132, and the RS depth map 134 are sent to a rectification module 140 to remove RS effects and output the rectified image 144.

Figure 2:
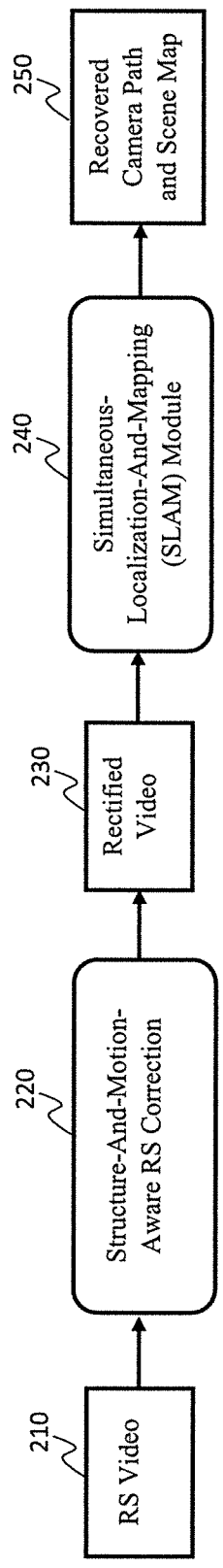
FIG. 2 is a block/flow diagram of an application of the RS correction method to simultaneous localization and mapping (SLAM) with RS videos, in accordance with embodiments of the present invention.

Regarding FIG. 2, the application of the RS correction method to simultaneous localization-and-mapping (SLAM) with RS videos is shown. An input RS video 210 is a set of consecutive image frames that have RS distortions. Each frame is then passed respectively to the RS correction method (e.g., structure-and-motion-aware RS correction 220) for removing RS effects and obtaining the corresponding rectified frame (or rectified video 230). The rectified frames 230 are then sent to a SLAM module 240 for estimating the camera trajectory and scene structures observed in the video (e.g., the recovered camera path and scene path 250).

Figure 3:
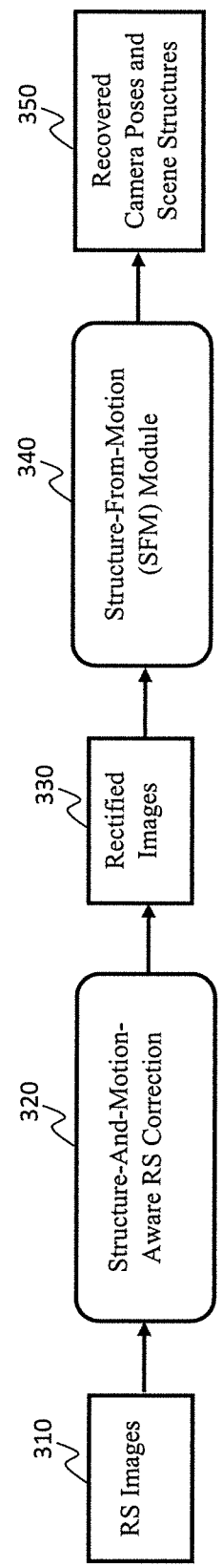
FIG. 3 is a block/flow diagram of an application of the RS correction method to structure from motion (SFM) with RS images, in accordance with embodiments of the present invention.

Regarding FIG. 3, the application of the RS correction method to structure-from-motion (SFM) with RS images is depicted. An unordered set of RS images 310 can be employed as input for SFM with RS images. Each image is then passed separately to the RS correction method (e.g., structure-and-motion-aware RS correction 320) for removing RS effects and obtaining the corresponding rectified image 330. The rectified images 330 are then sent to an SFM module 340 for estimating the camera poses and scene structures observed in the images (e.g., recovered camera poses and scene structures 350).

Regarding RS camera modeling and notations, let it be assumed that each RS image I has N scanlines in total, denoted as $L_i$ with i=1, ..., N, and that the camera is intrinsically calibrated. Since RS cameras capture each scanline sequentially, the projection matrix for camera pose at the exposure slot of $L_i$ can be denoted as: $P_i=[R_i\ T_i]$, with $R_i \in SO(3)$ and $T_i \in \mathbb{R}^3$ being a rotation matrix and a translation vector, respectively.

Regarding pure translation, suppose that during the exposure period of two images $I_1$ and $I_2$, the RS camera undergoes pure translational motion along a constant direction denoted by a unit-norm vector $t=[t_X, t_Y, t_Z]^T$, and thus $P_i$ of $I_1$ (respectively $P_j$ of $I_2$), defined relative to $P_1$ of $I_1$, can be expressed as $P_i=[I-p_i t]$ (respectively $P_j=[I-q_j t]$), where $p_i$ and $q_j$ are scalars determined by the camera motion magnitude and I represents a 3×3 identity matrix.

Regarding degeneracy analysis, the case of $t_z \neq 0$ is described. For $t_z=0$, such scenario will be described below. The method first formulates RS two-view geometry for pure translational camera motion between a pair of scanlines in the two images in terms of 2D correspondences and depths. Two scanlines $L_i$ of $I_1$ and $L_j$ of $I_2$ are considered with camera poses $P_i$ and $P_j$ respectively, and a 3D point S observed in both scanlines as $S_1 = [X_1, Y_1, Z_1]^T$ and $S_2 = [X_2, Y_2, Z_2]^T$ in $L_i$'s and $L_j$'s camera coordinates, respectively.

By denoting $T^{ij} = [T_X^{ij}, T_Y^{ij}, T_Z^{ij}]^T = (q_j - p_i)t$, the method can relate $S_1$ and $S_2$ by $S_2 = S_1 - T^{ij}$. Projecting this relationship into the 2D image, the following can be obtained:

$$\left[\frac{X_2}{Z_2}, \frac{Y_2}{Z_2}\right]^\top = \left[\frac{X_1 - T_X^{ij}}{Z_1 - T_Z^{ij}}, \frac{Y_1 - T_Y^{ij}}{Z_1 - T_Z^{ij}}\right]^\top.$$

Subtracting $$\left[\frac{T_X^{ij}}{T_Z^{ij}}, \frac{T_Y^{ij}}{T_Z^{ij}}\right]^\top$$

on both sides of the above equation and rearranging, the method arrives at:

$$s_2 - e = \frac{Z_1}{Z_1 - T_Z^{ij}}(s_1 - e), \quad (1)$$

where $$e = \left[\frac{T_X^{ij}}{T_Z^{ij}}, \frac{T_Y^{ij}}{T_Z^{ij}}\right]^\top = \left[\frac{t_x}{t_z}, \frac{t_y}{t_z}\right]^\top$$

denotes the epipole, and $s_1$ and $s_2$ are the 2D projections of $S_1$ and $S_2$, respectively (e.g., $s_1$ and $s_2$ is a 2D correspondence).

Figure 4:
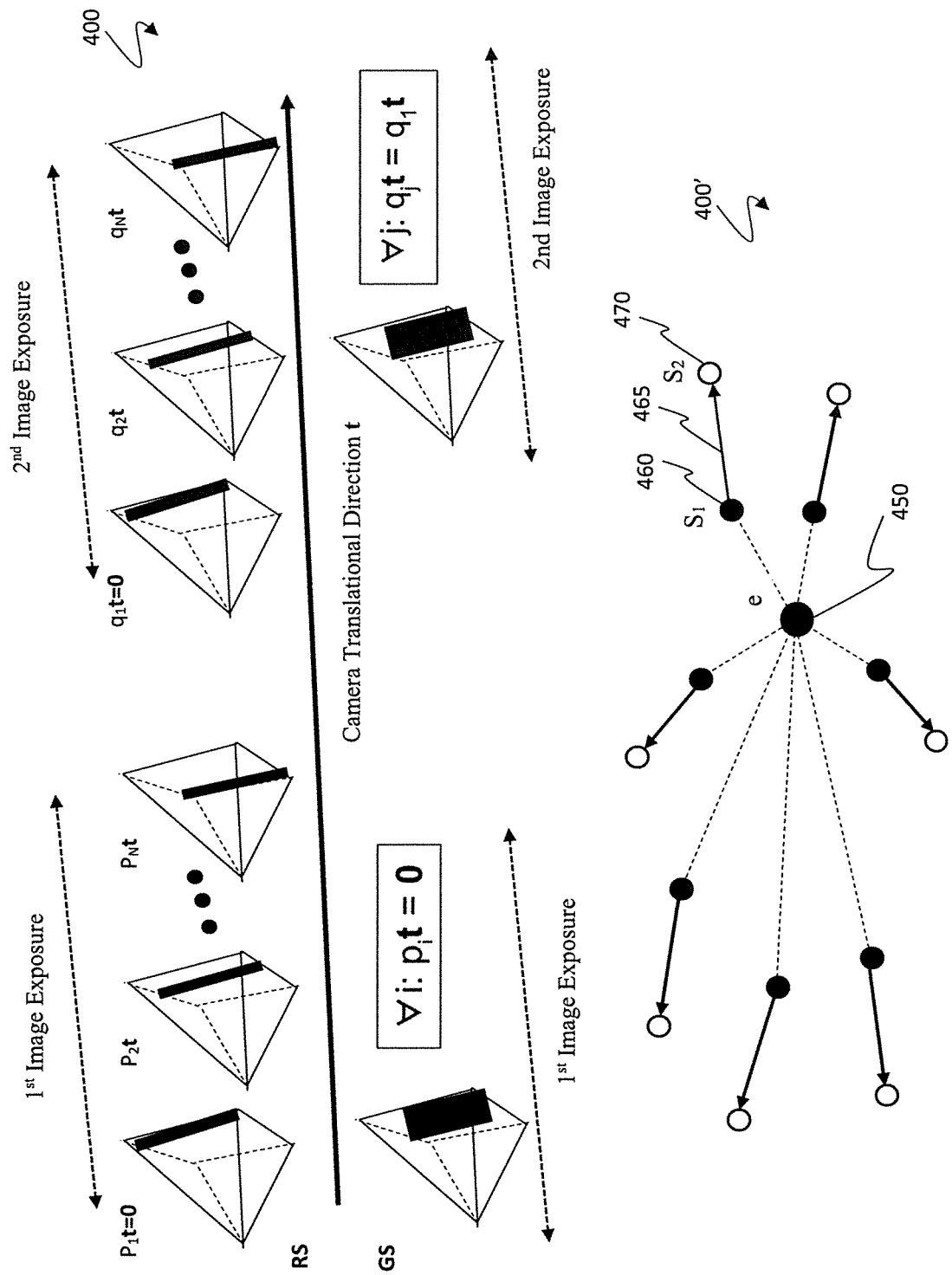
FIG. 4 is a block/flow diagram illustrating degeneracy in RS two-view geometry, in accordance with embodiments of the present invention.

Since e remains the same for any pair of scanlines, Eq. (1) indicates that all 2D points move along 2D lines radiating from the epipole 450, as illustrated in 400' of FIG. 4. The starting points are designated as 460 and the ending points are designated as 470. The displacement vectors are designated as 465. This pattern, however, is exactly the same as in a GS camera model, and is the sole cue to recognize a pure translational motion, in which case the epipole is also termed as the focus of expansion (FOE). Therein lies the ambiguity, and in particular, the observed 2D point displacements can be explained by a GS camera model, with the following perturbations to the real $T_Z^{ij}$ and $Z_1$:

Replacing all $T_Z^{ij}$ with a common $T_Z$ (recall that $T^{ij} = (q_j - p_i)t$ and hence $T_Z^{ij} = (q_j - p_i)t z$. One possible value of $T_Z$ is $q_1 t_Z$ achieved by setting $\forall i: p_i = 0$ and $\forall j: q_j = q_1$, as shown in 400 of FIG. 4); and, Distorting the depth $Z_1$ to become $$Z_1' = \frac{T_z}{T_z^{ij}} Z_1$$

for each point S. This value is obtained by solving $$\frac{Z_1'}{Z_1' - T_z} = \frac{Z_1}{Z_1 - T_Z^{ij}}$$

so that Eq. (1) still holds.

Moreover, even if it is known that the observed 2D point movements are captured with an RS camera, the per-scanline camera positions along the translational direction, namely $p_i$ and $q_j$, cannot be determined. Beyond the global scale ambiguity, there are evidently still infinite number of fake $p'_i$ and $q'_j$ that can produce a physically possible (e.g., positive) and yet distorted depth $$Z_1' = \frac{T_z^{ij'}}{T_z^{ij}} Z_1$$

with $T_z^{ij'} = (q'_j - p'_i)t$.

Intuitively, in the absence of rotation, RS-induced distortion does not affect the direction of 2D point displacements but their motion magnitude. A GS two-view Structure from Motion (SfM) process can still regard it as a pure translational camera motion (with no RS distortions) by compensating the RS distortions with an appropriate corruption in the depths. In other words, no SfM algorithm can extract the RS effects from 2D correspondences only under such motion. Further, even if it is known that an RS camera is being used, the SfM algorithm is still not able to select the correct camera positions and depths due to the infinite number of solutions. Such degeneracy also implies numerical difficulties in SfM when the amount of rotation is small and there are noises in image measurements, though such scenario is theoretically not degenerate.

Therefore, RS two-view geometry for pure translational camera motion is degenerate, in the sense that an individual cannot tell if the two images are captured with an RS or GS camera based on 2D correspondences only. Even if the camera is known to be RS a priori, the per-scanline camera positions along the translational direction, namely $p_i$ and $q_j$, cannot be determined. It is noted that such degeneracy in camera positions along a line also exists in other SfM problems, e.g., translation averaging with collinear camera motions.

Regarding the degeneracy analysis above, the degeneracy was analyzed in RS two-view geometry in the case of pure translation with $t_z \neq 0$. Below, the remaining case of pure translation is described with $t_z = 0$. Before that, it should be clarified that the pure translational camera motion refers to the camera motion throughout the two images of interest, not just the camera motion within the exposure period of each individual image. Furthermore, $p_i t$ and $q_j t$ represent the per-scanline camera positions in the world coordinate system, which is defined as that of the first scanline in the first image (i.e. $p_1 = 0$), and hence the projection matrices $P_i$ and $P_j$ can be expressed as $P_i = [I - p_i t]$ and $P_j = [I - q_j t]$.

In the case of pure translation with $t_z = 0$, e.g., camera motion is lateral, the method denotes $T^{ij} = [T_X^{ij}, T_Y^{ij}, 0]^T = (q_j - p_i)t$, and still, the 3D points S1 and S2 can be related by $S_2 = S_1 - T^{ij}$. Projecting this relationship into 2D images, the below equation is obtained, which corresponds to Eq. (1) above, $$s_2 = s_1 - \frac{1}{Z_1}[T_X^{ij}, T_Y^{ij}]^\top = s_1 - \frac{(q_j - p_i)}{Z_1}[t_x, t_y]^\top. \quad (S1)$$

This equation indicates that all 2D points move in the same direction, e.g., $[t_x, t_y]^T$, which is also what happens when a GS camera is used.

Moreover, even if the camera being used for capturing the 2D point displacements is known to be an RS camera, the per-scanline camera positions along the translational direction, e.g., $p_i$ and $q_j$, cannot be determined from 2D correspondences only. This is because, beyond the global scale ambiguity, there are still infinite number of fake $p'_i$ and $q'_j$ that can produce physically possible (e.g., positive) and yet distorted depth $$Z'_1 = \frac{(q'_j - p'_i)}{(q_j - p_i)} Z_1$$

such that Eq. (S1) still holds.

It is noted that assuming constant velocity throughout the exposure period of the two images does not remove the degeneracy. If the two images are taken from two consecutive frames from a video and the readout time is further assumed known, the degeneracy disappears. However, readout time calibration is nontrivial. Thus, this requirement poses restrictions on the applications.

In the following, details of the network architecture and training data generation for single-view RS correction are identified. Also, an ambiguity arising during network training is further identified.

Regarding converting the RS image to a GS image (rectification), the network of the exemplary embodiments of the present invention takes a single RS image as input and predicts a corresponding RS camera motion and RS depth map, which can be used to perform rectification. In particular, for every pixel in the RS image, the exemplary method can first back-project it to a 3D point using the estimated depth and then use the estimated per-scanline camera pose to project the 3D point to the GS canvas (the plane defined by $P_1$ of the first scanline), yielding the rectified image. For modeling an RS camera motion, the exemplary method employs a 6-degree-of-freedom (DOF) motion model and assumes the camera has a constant velocity during the exposure period.

In particular, the method denotes the constant per-scanline translational velocity and rotational velocity by $v \in \mathbb{R}^3$ and $w \in so(3)$, and writes $P_i = [\exp((i-1)w)^T - (i-1)v]$.

Figure 5:
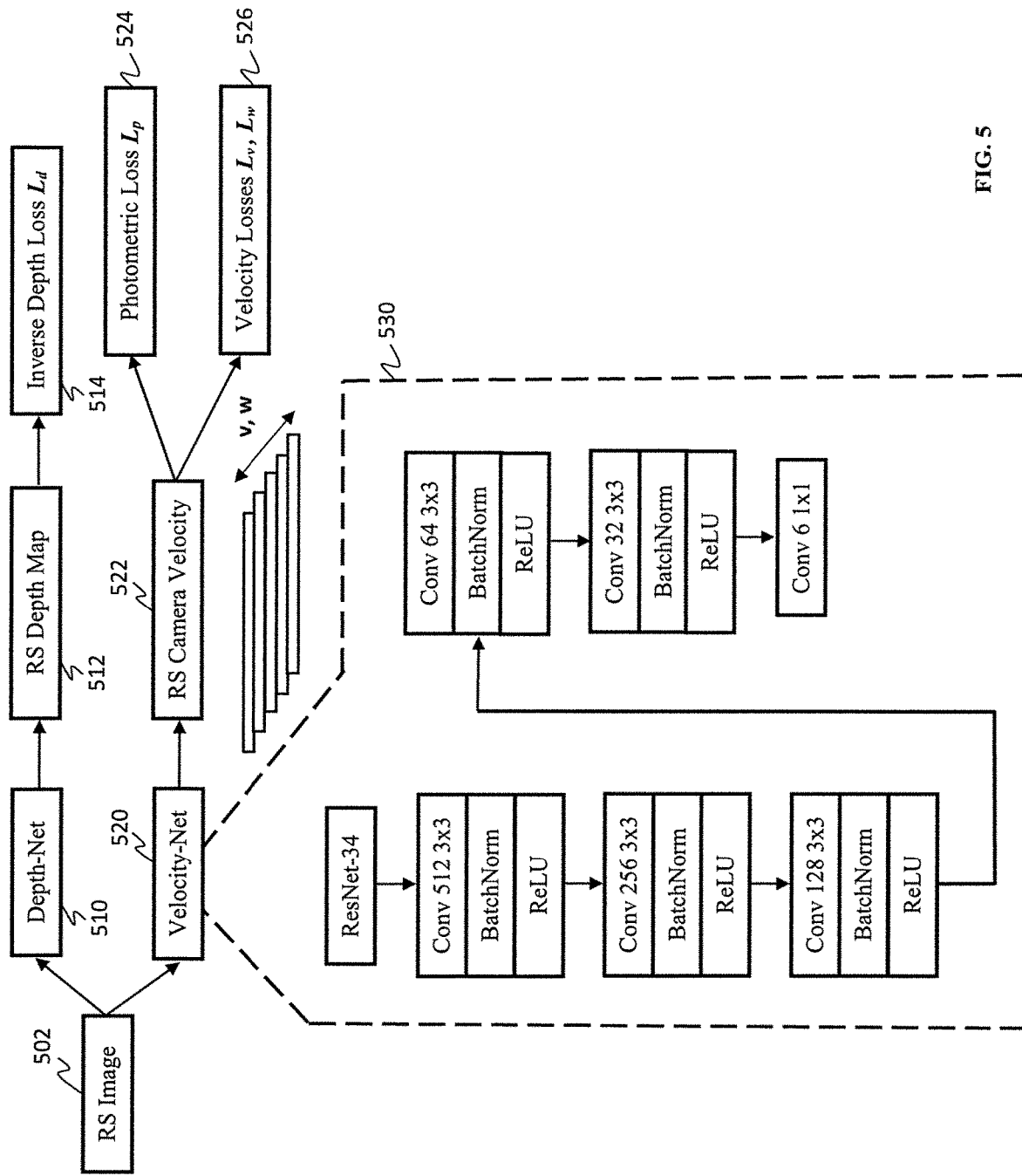
FIG. 5 is a block/flow diagram of an example architecture of the structure-and-motion-aware RS correction network, in accordance with embodiments of the present invention.

The network of the exemplary embodiments of the present invention includes two sub-networks, namely Depth-Net 510 and Velocity-Net 520, for learning an RS depth map 512 and an RS camera motion 522, respectively from a single RS image 502, as shown in FIG. 5. Following SfMLearner, the method adopts DispNet as the Depth-Net for single-view RS depth estimation. For the Velocity-Net, the method adapts the ResNet-34 architecture 530 by removing the last average pooling layer and adding four 3×3 convolutional layers (each followed by a BatchNorm layer and a ReLU activation layer) for extracting features and one 1×1 convolutional layer (with no bias) for regressing a 6-DOF camera velocity, namely a 3D translational velocity vector v and 3D angular velocity vector w.

The Depth-Net 510 is trained by employing a regression loss $\mathcal{L}_d$. The regression loss or inverse depth loss is designated as 514. Inverse depth is regressed (instead of depth) to account for increasing uncertainty with increasing depth.

For the Velocity-Net 520, the training losses include regression losses $\mathcal{L}_v$ and $\mathcal{L}_w$ (or velocity losses 526) for evaluating the estimated translational and angular velocity respectively, and a photometric loss $\mathcal{L}_p$, also designated as 524, which minimizes pixel intensity differences between the rectified image (obtained with the predicted camera velocity and the ground truth depth map) and the corresponding ground truth GS image (pixel intensities are scaled to [0,1] before computing $\mathcal{L}_p$. Note that the two networks are trained separately, since the method relies on synthetic training data, which have ground truth for supervision of each network. The method uses $L_1$ norm for all the above losses.

Therefore, in contrast to geometry-based methods, the learning-based approach employed by the exemplary embodiments of the present invention needs a large amount of training data, including RS images with ground truth RS camera velocities and RS depth maps. Since it is difficult to capture real RS images with ground truth velocity and per-pixel depth labels, the method puts forth a synthetic training data generation pipeline, based on the KITTI Raw dataset, which includes training and testing data.

Regarding converting the GS image to a RS image (distortion), the method takes the left view of the stereo pair in the KITTI Raw dataset as the ground truth GS image. The method first computes the dense GS depth map from stereo using a state-of-the-art stereo method. Next, the method generates a 6-DOF camera velocity as the ground truth RS camera motion which gives the per-scanline camera pose as well. The method projects each pixel in the GS image to the RS canvas, yielding the RS image. In particular, since it is not known which RS scanline the projected pixel will fall on to, the method thus projects each pixel $s^{GS}$ (with the corresponding depth $Z_s^{GS}$) using all RS scanlines $L_i$ (with the corresponding per-scanline camera pose $P_i$) and then selects the 2D projection that is nearest to the hypothesized scanline as the corresponding image point in the RS image. This selection of scanline (and hence 2D projection) is made via the following equation:

$$L_i^* = \underset{L_i}{\mathrm{argmin}} \left\| [L_i]_y - \left[ \prod\nolimits_{P_i} (s^{GS}, Z_s^{GS}) \right]_y \right\|, \qquad (2)$$

where $\Pi p_i$ is the projection function corresponding to the scanline $L_i$ in the RS image and $[\bullet]_y$ returns the row index of a 2D projection or a scanline. Since the above projections produce a set of image points scattered in between the grid intersections of the RS image, the method performs interpolations to complete all pixels in the RS image. Note that in the above projections, the method obtains the RS per-pixel depth as well to provide the ground truth for training the Depth-Net 510. Also, since the KITTI camera is firmly mounted on the vehicle and hence has little variation in pitch and roll (yaw varies largely when the vehicle turns), the method applies a small randomly sampled homography transformation on the ground truth GS image to increase pitch and roll variation before rendering the RS image.

It is noted that since the RS camera often undergoes a small motion during the short exposure period, the rendering is generally able to maintain the sharpness in the original GS image and meanwhile exhibit the desired geometrical distortions in the rendered RS image. Also, due to errors arising from occlusion boundaries and imperfect stereo depth maps, the generated images inevitably include some small artifacts. However, the network of the exemplary embodiments of the present invention is able to tolerate them and learn useful information.

The preceding training data generation pipeline returns training images of different sizes, whereas deep learning toolboxes require them to have the same size for efficient computation. To achieve this, an individual can either crop the images or resize them. Here, it is shown that the choice between these two options matters and opting for resizing can lead to inferior performance. In particular, the method shows that the distortion (or the corresponding undistortion) induced by a small RS camera rotation around the x-axis, namely $w_x$, is similar to the changes caused by a vertical image resizing. Thus, resizing may undo or aggravate the amount of distortion actually brought about by the $w_x$ in the training data, confusing the network in its learning of the correct camera motion.

Specifically, consider a pixel with coordinates (x, y) in a scanline $L_i$ (corresponding to the pose $P_i=[\exp((i-1)[w_x, 0, 0]^T)^T 0])$.

The undistortion flow that will bring the RS image back to the GS image plane can be written as:

$$u_x^{RS}=-(i-1)w_x(x-x_0)(y-y_0)/f^2,$$

$$u_y^{RS}=-(i-1)w_x(1+(y-y_0)^2/f^2), \quad (3)$$

where $(x_0, y_0)$ and f represent the principle point and focal length respectively, and differential expressions can be employed to approximate the displacement induced by the small motion. Note that this undistortion flow will be dominated by the linear term $-(i-1)w_x$ in a small to medium field of view. When the method performs vertical image resizing without properly compensating for its effect in the ground truth camera rotation $w_x$, the camera motion to be learnt will be confounded. This is because Eq. (3) coincides with the displacement field induced by vertically resizing the image by a factor of $(1+w_x)$ (the first row is taken as the reference row).

While an individual may be reminded by this phenomenon of the well-known Bas-Relief ambiguity in the classical SfM, it is noted that, unlike Bas-Relief ambiguity, there is no confounding between $w_y$ and horizontal image resizing in the instant case, as the distortion induced by the pose $P_i$ only depends on the row index i and not the column index.

Moreover, regarding the ambiguity between $w_x$-induced distortion and vertical image resizing, the ambiguity was described under the case of pure rotational camera motion $w_x$ for ease and clarity of explanation. However, it should be realized that, for the more general 6-DOF camera motion that is simulated for each RS image in the training data, such confounding is reduced due to the (un-)distortion flow induced by the other 5 DOFs. However, the overall confounding effect of this ambiguity still exists, and the training (on RS images with 6-DOF camera motions) is still affected. It is also noted that since resizing changes the focal length associated with the image, it is thus possible to distinguish the resizing effect by embedding the appropriately updated focal length into the training. However, cropping is a more straightforward solution.

Figure 6:
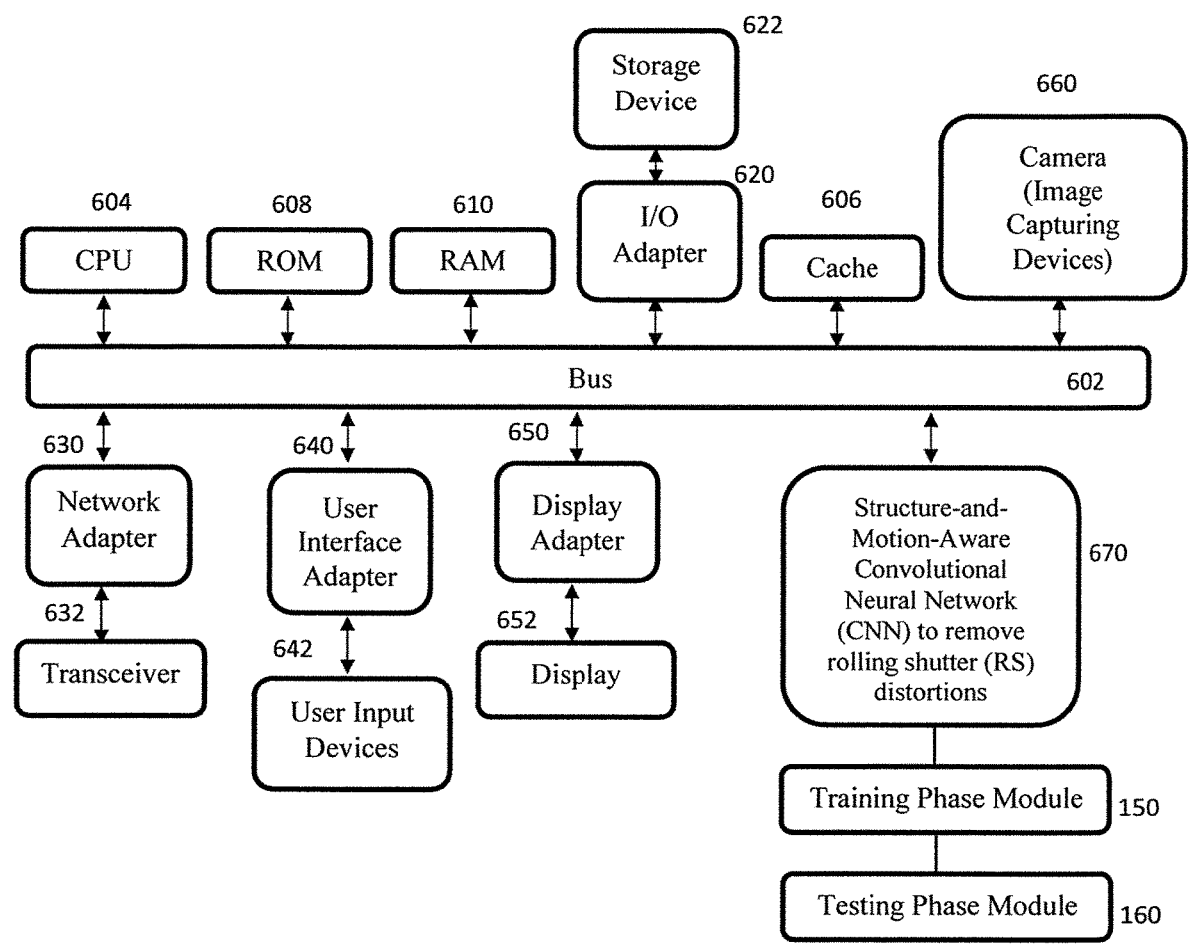
FIG. 6 is block/flow diagram of an exemplary processing system for correcting rolling shutter (RS) effects, in accordance with embodiments of the present invention.

FIG. 6 is block/flow diagram of an exemplary processing system for correcting rolling shutter (RS) effects, in accordance with embodiments of the present invention.

The processing system includes at least one processor or processor device (CPU) 604 operatively coupled to other components via a system bus 602. A cache 606, a Read Only Memory (ROM) 608, a Random Access Memory (RAM) 610, an input/output (I/O) adapter 620, a network adapter 630, a user interface adapter 640, and a display adapter 650, are operatively coupled to the system bus 602. One or more cameras 660 can be connected to bus 602. The cameras 660 can employ a structure-and-motion-aware CNN 670 to remove the rolling shutter (RS) distortions by employing a training module 150 and a testing module 160.

A storage device 622 is operatively coupled to system bus 602 by the I/O adapter 620. The storage device 622 can be any of a disk storage device (e.g., a magnetic or optical disk storage device), a solid state magnetic device, and so forth.

A transceiver 632 is operatively coupled to system bus 602 by network adapter 630.

User input devices 642 are operatively coupled to system bus 602 by user interface adapter 640. The user input devices 642 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 642 can be the same type of user input device or different types of user input devices. The user input devices 642 are used to input and output information to and from the processing system.

A display device 652 is operatively coupled to system bus 602 by display adapter 650.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, processor devices, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 7:
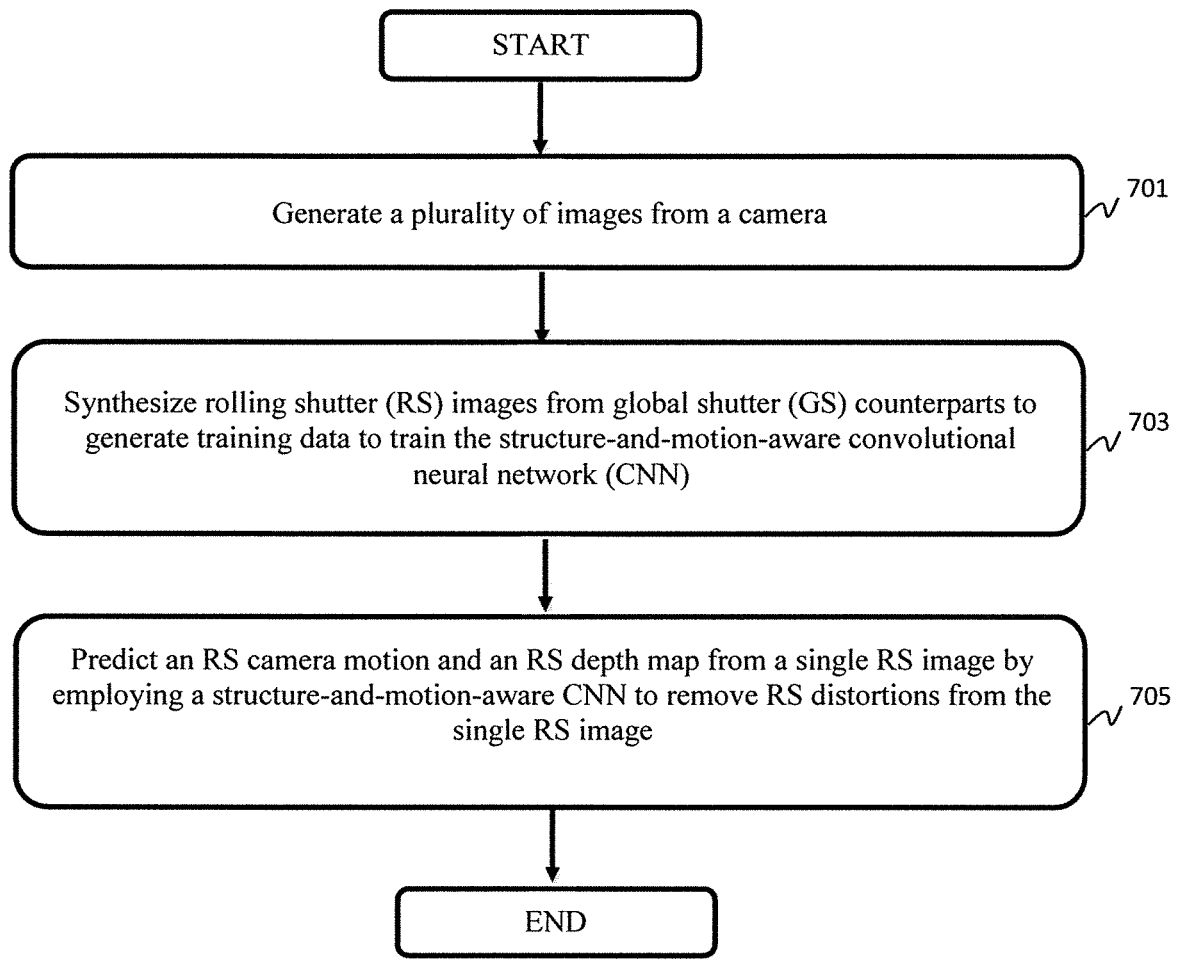
FIG. 7 is a block/flow diagram of an exemplary method for correcting rolling shutter (RS) effects, in accordance with embodiments of the present invention.

FIG. 7 is a block/flow diagram of an exemplary method for correcting rolling shutter (RS) effects, in accordance with embodiments of the present invention.

At block 701, a plurality of images are generated from a camera.

At block 703, rolling shutter (RS) images are synthesized from global shutter (GS) counterparts to generate training data to train the structure-and-motion-aware convolutional neural network (CNN).

At block 705, an RS camera motion and an RS depth map are predicted from a single RS image by employing a structure-and-motion-aware CNN to remove RS distortions from the single RS image.

In summary, the exemplary embodiments of the present invention identify and describe a degenerate case in RS two-view geometry and introduce a novel CNN-based approach for single-view RS correction, which is guided by the underlying geometrical properties of the problem. The method achieves superior performance compared to other state-of-the-art methods for single-view RS correction on both synthetic and real data.

The exemplary embodiments of the present invention further achieve more diverse and realistic synthesized RS images. The exemplary methods generate more diverse and realistic RS images at a large scale, which can be used for training CNNs. The exemplary embodiments of the present invention further achieve less constraints for SFM/SLAM. The exemplary methods remove RS effects and allow traditional SFM/SLAM methods designed for GS images and/or videos to be applicable to RS images and/or videos.

Stated differently, a structure-and-motion-aware CNN for estimating RS camera motion and RS depth map from a single input RS image is introduced. The camera motion and depth map output by the CNN can then be employed for removing RS distortions in the input image. To obtain a large-scale dataset of diverse and realistic RS images for training the CNN, the exemplary embodiments of the present invention employ a full 6D camera motion model and identify a structure-and-motion-aware RS distortion synthetization pipeline, which exploits both camera motion and depth map during rendering. Finally, the approach is applied to SFM/SLAM with RS images/videos.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for correcting rolling shutter (RS) effects, the method comprising:
    generating a plurality of images from a camera;
    synthesizing RS images from global shutter (GS) counterparts to generate training data to train the structure-and-motion-aware convolutional neural network (CNN); and
    predicting an RS camera motion and an RS depth map from a single RS image by employing a structure-and-motion-aware CNN to remove RS distortions from the single RS image.

2. The method of claim 1, further comprising, during a training phase, employing a set of GS images and corresponding GS depth maps to generate synthesized RS camera motions and synthesized RS depth maps.

3. The method of claim 2, further comprising providing the synthesized RS camera motions, the synthesized RS depth maps, and the synthesized RS images to the structure-and-motion-aware CNN as supervision signals and input data, respectively, to train the structure-and-motion-aware CNN.

4. The method of claim 3, further comprising, during a testing phase, providing the single RS image to the structure-and-motion-aware CNN to predict the RS camera motion and the RS depth map corresponding to the input RS image.

5. The method of claim 4, further comprising transmitting the single RS image, the RS camera motion, and the RS depth map to a rectification module to remove the RS effects.

6. The method of claim 5, further comprising outputting a rectified image from the rectification module.

7. The method of claim 1, wherein the structure-and-motion-aware CNN includes a depth network for learning the RS depth map and a velocity network for learning the RS camera motion.

8. The method of claim 7, wherein the depth network is trained separately from the velocity network.

9. A non-transitory computer-readable storage medium comprising a computer-readable program for correcting rolling shutter (RS) effects, wherein the computer-readable program when executed on a computer causes the computer to perform the steps of:
    generating a plurality of images from a camera;
    synthesizing RS images from global shutter (GS) counterparts to generate training data to train the structure-and-motion-aware convolutional neural network (CNN); and
    predicting an RS camera motion and an RS depth map from a single RS image by employing a structure-and-motion-aware CNN to remove RS distortions from the single RS image.

10. The non-transitory computer-readable storage medium of claim 9, wherein, during a training phase, a set of GS images and corresponding GS depth maps are employed to generate synthesized RS camera motions and synthesized RS depth maps.

11. The non-transitory computer-readable storage medium of claim 10, wherein the synthesized RS camera motions, the synthesized RS depth maps, and the synthesized RS images are provided to the structure-and-motion-aware CNN as supervision signals and input data, respectively, to train the structure-and-motion-aware CNN.

12. The non-transitory computer-readable storage medium of claim 11, wherein, during a testing phase, the single RS image is provided to the structure-and-motion-aware CNN to predict the RS camera motion and the RS depth map corresponding to the input RS image.

13. The non-transitory computer-readable storage medium of claim 12, wherein the single RS image, the RS camera motion, and the RS depth map are transmitted to a rectification module to remove the RS effects.

14. The non-transitory computer-readable storage medium of claim 13, wherein a rectified image is output from the rectification module.

15. The non-transitory computer-readable storage medium of claim 9, wherein the structure-and-motion-aware CNN includes a depth network for learning the RS depth map and a velocity network for learning the RS camera motion.

16. The transitory computer-readable storage medium of claim 15, wherein the depth network is trained separately from the velocity network.

17. A system for correcting rolling shutter (RS) effects, the system comprising:
    a memory; and
    one or more processors in communication with the memory configured to:
        generate a plurality of images from a camera;

synthesize RS images from global shutter (GS) counterparts to generate training data to train the structure-and-motion-aware convolutional neural network (CNN); and predict an RS camera motion and an RS depth map from a single RS image by employing a structure-and-motion-aware CNN to remove RS distortions from the single RS image.

18. The system of claim 17, wherein, during a training phase, a set of GS images and corresponding GS depth maps are employed to generate synthesized RS camera motions and synthesized RS depth maps.

19. The system of claim 18, wherein the synthesized RS camera motions, the synthesized RS depth maps, and the synthesized RS images are provided to the structure-and-motion-aware CNN as supervision signals and input data, respectively, to train the structure-and-motion-aware CNN.

20. The system of claim 19, wherein, during a testing phase, the single RS image is provided to the structure-and-motion-aware CNN to predict the RS camera motion and the RS depth map corresponding to the input RS image.

* * * * *